US012072059B2

(12) United States Patent
You et al.

(10) Patent No.: US 12,072,059 B2
(45) Date of Patent: Aug. 27, 2024

(54) SUPPORT DEVICE

(71) Applicant: NINGBO TUOTUO RIVER DESIGN COMPANY, Zhejiang (CN)

(72) Inventors: Xiaodong You, Zhejiang (CN); Hongjun Wang, Zhejiang (CN)

(73) Assignee: NINGBO TUOTUO RIVER DESIGN COMPANY, Ningbo (CN)

( * ) Notice: Subject to any disclaimer, the term of this patent is extended or adjusted under 35 U.S.C. 154(b) by 231 days.

(21) Appl. No.: 17/588,282

(22) Filed: Jan. 30, 2022

(65) Prior Publication Data

US 2023/0146170 A1 May 11, 2023

(30) Foreign Application Priority Data

Nov. 10, 2021 (CN) .......................... 202122749677.3

(51) Int. Cl.
*F16M 11/24* (2006.01)
*F16M 11/38* (2006.01)

(52) U.S. Cl.
CPC ........... *F16M 11/242* (2013.01); *F16M 11/38* (2013.01)

(58) Field of Classification Search
CPC ...... F16M 11/16; F16M 11/245; F16M 11/28; F16M 11/242; F16M 11/38
USPC ....... 248/603, 169, 171, 525–526, 166, 168, 248/170
See application file for complete search history.

(56) References Cited

U.S. PATENT DOCUMENTS

| | | | | |
|---|---|---|---|---|
| 243,298 A | * | 6/1881 | Perkins .................. | F16M 11/28 248/171 |
| 361,527 A | * | 4/1887 | Kazanjian .............. | A47C 9/105 108/158 |
| 383,535 A | * | 5/1888 | McPherson ............ | F16M 11/28 248/171 |
| 637,622 A | * | 11/1899 | Krick ..................... | F16M 11/20 248/187.1 |
| 773,787 A | * | 11/1904 | Crossman et al. ...... | D06F 57/04 126/30 |
| 773,788 A | * | 11/1904 | Duffy ....................... | A47F 5/02 211/167 |
| 1,713,673 A | * | 5/1929 | Nelson .................... | D06F 57/04 248/173 |
| 1,849,898 A | * | 3/1932 | Wright ................... | F16M 11/16 248/158 |
| 1,866,175 A | * | 7/1932 | Rogers, Jr. ........... | A47D 13/105 248/164 |

(Continued)

*Primary Examiner* — Ingrid M Weinhold
(74) *Attorney, Agent, or Firm* — Samson G. Yu

(57) ABSTRACT

The disclosure provides a support device. The support device includes an upright column, a positioning member, a base, a plurality of support legs and an elastic structure. The base is connected with the upright column. Each support leg passes through a corresponding mounting through hole in the plurality of mounting through holes to be pivotally connected with the positioning member. The upright column is movably arranged up and down relative to the positioning member, the upright column has at least a first position located above the support legs and a second position located between the plurality of support legs. The elastic structure is disposed at peripheries of the plurality of support legs, and configured to apply acting force to axial first ends of the support legs to cause the axial first ends to move inward radially.

17 Claims, 12 Drawing Sheets

(56) References Cited

U.S. PATENT DOCUMENTS

| | | | | |
|---|---|---|---|---|
| 2,059,996 | A | * | 11/1936 | Goldberg ................ E01F 9/688 |
| | | | | 40/610 |
| 2,204,013 | A | * | 6/1940 | Gaidos ................... F16M 11/12 |
| | | | | 248/168 |
| 2,269,317 | A | * | 1/1942 | Place ................. A47G 25/0664 |
| | | | | 248/171 |
| 2,733,881 | A | * | 2/1956 | Threlfall et al. ......... A01G 5/04 |
| | | | | 211/24 |
| 4,317,553 | A | * | 3/1982 | Meinunger ............ G03B 21/58 |
| | | | | 211/203 |
| 5,497,971 | A | * | 3/1996 | Spiro ................... A47B 23/043 |
| | | | | 248/455 |
| 5,913,269 | A | * | 6/1999 | Franssen ................ A47B 13/16 |
| | | | | 108/150 |
| 6,259,373 | B1 | * | 7/2001 | Ghahramani ............ B60Q 7/00 |
| | | | | 340/815.4 |
| 7,611,104 | B1 | * | 11/2009 | Gifford, Sr. ............ F16M 11/28 |
| | | | | 248/176.3 |
| 11,426,323 | B2 | * | 8/2022 | Thies ....................... A45B 9/04 |
| 2005/0056739 | A1 | * | 3/2005 | Koning ................. F16M 11/16 |
| | | | | 248/171 |
| 2021/0400175 | A1 | * | 12/2021 | Dunn ..................... F16M 11/14 |

* cited by examiner

SUPPORT DEVICE

CROSS-REFERENCE TO RELATED APPLICATION(S)

The present utility model claims priority to patent application No. 202122749677.3, filed to the China National Intellectual Property Administration on Nov. 10, 2021 and entitled "Support Device".

TECHNICAL FIELD

The disclosure relates to the technical field of supports, and in particular, to a support device.

BACKGROUND

At present, a support device known to inventors requires various accessories and mounting tools when in use, which takes a long time, and therefore, it is inconvenient to mount and store.

SUMMARY

Some embodiments of the disclosure are mainly intended to provide a support device, to resolve inconvenient mounting and storage of support devices in a related art.

According to an aspect of some embodiments of the disclosure, a support device is provided and includes an upright column, a positioning member, a base, a plurality of support legs and an elastic structure. The positioning member is provided with a first avoidance through hole for the upright column to pass through. The base is located on a side of the positioning member and fixedly connected with the upright column. The plurality of support legs are spaced apart from each other in a circumferential direction of the upright column. The base is provided with a plurality of mounting through holes corresponding to the plurality of support legs. Each support leg passes through a corresponding mounting through hole in the plurality of mounting through holes, and then the each support leg is pivotally connected with the positioning member. The upright column is movably arranged up and down relative to the positioning member, to have at least a first position located above the support legs and a second position located between the plurality of support legs. The elastic structure is disposed at peripheries of the plurality of support legs and configured to apply acting force to axial first ends of the support legs to cause the axial first ends to move inward radially. When the upright column drives the base to move upwards to the first position, axial second ends of the support legs are opened outwards. Inner wall surfaces of the mounting through holes abut against outer wall surfaces of the corresponding support legs respectively, so as to keep the support legs in an open position. When the upright column drives the base to move downwards to the second position, the base is located on the axial second ends of the support legs, and the support legs are in a storage position.

In some embodiments, the support device further includes an operating member and a plurality of locking members. The operating member is connected with the positioning member and defines a second avoidance through hole corresponding to the first avoidance through hole. The positioning member is located between the operating member and the base. The plurality of locking members are connected with the operating member. The plurality of locking members are spaced apart from each other in a circumferential direction of the second avoidance through hole. The plurality of locking members are disposed corresponding to the plurality of support legs. Each of the plurality of locking members has a locking position that abut against the axial first end of a corresponding support leg in the plurality of support legs and an unlocking position separated from the axial first end of the corresponding support leg. The operating member is configured to drive the each of the plurality of locking members to switch between the locking position and the unlocking position.

In some embodiments, the operating member is rotatable relative to the positioning member.

In some embodiments, the positioning member is provided with a first elongated hole extending around a central axis of the first avoidance through hole. A first protruding pillar is disposed on the operating member. The first protruding pillar is in a slip fit relationship with the first elongated hole to realize rotation of the operating member. The support device further includes a fastening member. The first protruding pillar is connected with the fastening member to fix the operating member on the positioning member.

In some embodiments, there is a plurality of first elongated holes, the positioning member is provided with a plurality of first mounting notches corresponding to the plurality of support legs. The support device further includes a connecting member. The connecting member includes a connecting plate and a plurality of long columns. The connecting plate defines a third avoidance through hole corresponding to the first avoidance through hole. The plurality of long columns are connected with the connecting plate. The plurality of long columns are spaced apart from each other in a circumferential direction of the third avoidance through hole and correspond to the plurality of first elongated holes. The connecting member further includes a plurality of second elongated holes penetrating the connecting plate and the plurality of long columns. The connecting plate is provided with a plurality of second mounting notches. The plurality of second mounting notches are correspond to the plurality of support legs. The plurality of second mounting notches is spaced apart from each other in the circumferential direction of the third avoidance through hole. An axial first end of the each support leg in sequence passes through a corresponding first mounting notch and a corresponding second mounting notch. The first protruding pillar is connected with the fastening member after passing through a corresponding second elongated hole.

In some embodiments, the positioning member is further provided with a plurality of mounting grooves corresponding to the plurality of first mounting notches. Each mounting groove communicates with a corresponding first mounting notch in the plurality of first mounting notches. A pivot shaft is disposed on the axial first end of the each support leg. The pivot shaft is mounted in the corresponding mounting groove. The support device further includes a plurality of anti-separating members connected with the connecting plate. The plurality of anti-separating members are disposed corresponding to the plurality of mounting grooves. Each of the anti-separating members is abutted against the corresponding pivot shaft, to prevent the support leg from separating from the positioning member.

In some embodiments, the axial first end of the each of the support legs has a first inclined surface. When the each of the support legs is in the open position, the first inclined surface is abutted against an inner wall surface of the corresponding first mounting notch.

In some embodiments, the support device further includes a blocker connected with the base. The blocker is disposed on a radial outer side of at least one mounting through hole. The blocker has a second inclined surface. When the each of the support legs is in the open position, the second inclined surface is abutted against an outer wall surface of a corresponding support leg in the plurality of support legs.

In some embodiments, the blocker also has a vertical surface connected with the second inclined surface. When the each support leg is in the storage position, the vertical surface bears is abutted the outer wall surface of the corresponding support leg.

In some embodiments, each of plurality of support legs is provided with a groove. The elastic structure comprises an elastic member. The elastic member is clamped in the groove.

In some embodiments, the support device further includes a fixation structure configured to keep the upright column in the second position. The fixation structure includes a first fixation member disposed on a side of the operating member and a second fixation member disposed on the upright column. When the upright column is in the second position, the first fixation member is connected with the second fixation member. When the upright column is in the first position, the first fixation member is separated from the second fixation member.

In some embodiments, the first fixation member is connected with the second fixation member by a magnetic attractable manner; or, the first fixation member is in clamping connection with the second fixation member.

In some embodiments, the second fixation member is movable in a vertical direction relative to the upright column.

In some embodiments, the support device further includes a pedal structure. The pedal structure is disposed on the axial second end of at least one support leg in the plurality of support legs.

Through the technical solution of some embodiments of the disclosure, when the upright column is in the first position and under the action of the elastic structure, the support legs are in the open position, so that the support device can support a to-be-supported member. When the upright column is moved downwards to the second position, the support legs are in the storage position, so that the support device is small in size, which is convenient to carry, store and transport. Because the fixed mounting and closing of the support device can be realized only by moving the upright column to the first position and the second position without complex mounting steps and extra mounting tools, the support device is conveniently mounted and stored. The inner wall surface of the mounting through hole is abutted against the outer wall surface of the corresponding support leg to keep the support leg in the open position, so that the use stability of the support device is ensured. In addition, the plurality of support legs is pivotally connected with the positioning member. According to a seesaw principle, when an axial first end of each support leg is moved inwards or outwards, the positioning member is equivalent to a fulcrum of the each support leg. In this way, an axial second end of the each support leg can be correspondingly opened or closed. Therefore, the mounting and storage of the support device can be realized.

BRIEF DESCRIPTION OF THE DRAWINGS

The accompanying drawings of the specification described herein are used to provide a further understanding of the disclosure, and constitute a part of this application. The exemplary embodiments and descriptions of the disclosure are used to explain the disclosure and do not constitute an improper limitation of the disclosure. In the drawings.

Figure 1:
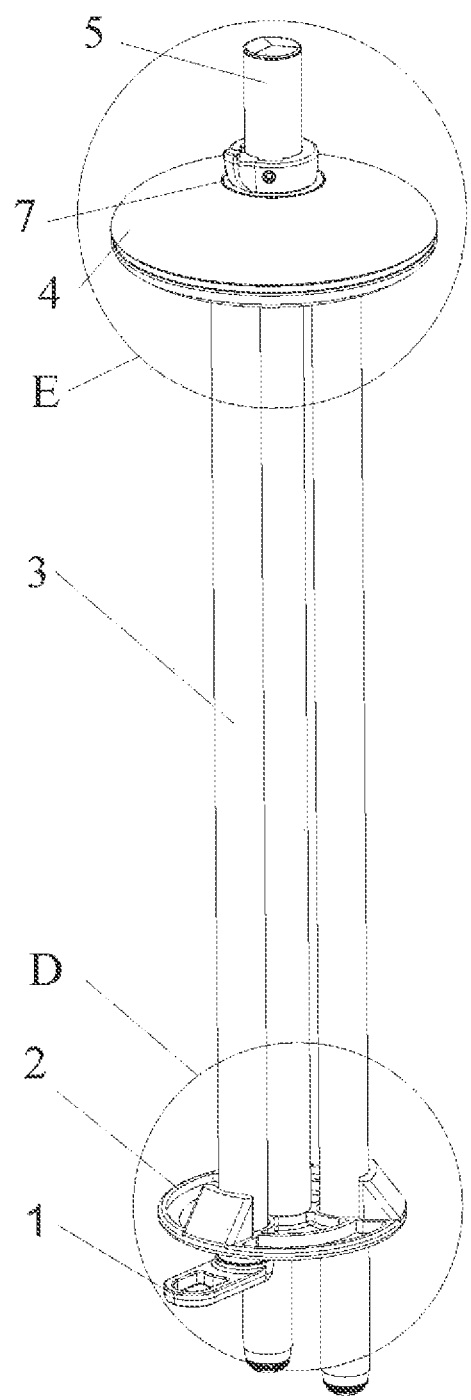
FIG. 1 shows a schematic structural diagram of a support device according to an embodiment of the disclosure (wherein, support legs are in a storage position).

The above accompanying drawings include the following reference numerals:

1. Pedal structure; 10. Positioning member; 11. Elastic structure; 12. Fastening member; 13. First avoidance through hole; 14. Mounting groove; 15. Pivot shaft; 16. First elongated hole; 17. First mounting notch; 18. Locking member; 19. First protruding pillar; 2. Base; 21. Second inclined surface; 22. Vertical surface; 23. Mounting through hole; 24. Blocker; 3. Support leg; 31. Groove; 32. Mounting hole; 33. First inclined surface; 4. Operating member; 41. Second avoidance through hole; 5. Upright column; 51. Second fixation member; 52. Clamp; 7. First fixation member; 80. Upper cover assembly; 9. Connecting member; 91. Anti-separating member; 92. Second elongated hole; 93. Second mounting notch; 94. Third avoidance through hole; 95. Connecting plate; 96. Long column; 97. Positioning column; 98. Third inclined surface.

DETAILED DESCRIPTION OF THE EMBODIMENTS

It is to be noted that the embodiments in this application and the features in the embodiments may be combined with one another without conflict. The disclosure will now be described below in detail with reference to the drawings and the embodiments.

It is to be noted that, in the embodiments of the disclosure, an end of a support leg 3 that has a pedal structure 1 is an axial second end, and an end having a groove 31 is an axial first end. A pivot point between each support leg 3 and a positioning member 10 is located between the axial first end and the axial second end of the support leg 3.

As shown in FIG. 1 to FIG. 4, some embodiments of the disclosure provide a support device. The support device includes an upright column 5, the positioning member 10, a base 2, a plurality of support legs 3, and an elastic structure 11. The positioning member 10 is provided with a first avoidance through hole 13 for the upright column 5 to pass through. The base 2 is located on a side of the positioning member 10 and fixedly connected with the upright column 5. The plurality of support legs 3 are provided at intervals in a circumferential direction of the upright column 5. The base 2 is provided with a plurality of mounting through holes 23 corresponding to the plurality of support legs 3. After penetrating a corresponding mounting through hole 23, each of the plurality of support legs 3 is pivotally connected with the positioning member 10. The upright column 5 is movably arranged up and down relative to the positioning member 10, to have at least a first position located above the plurality of support legs 3 and a second position located between the plurality of support legs 3. The elastic structure 11 is disposed at peripheries of the plurality of support legs 3, and configured to apply acting force to axial first ends of the support legs 3, so as to cause the axial first ends to move inward radially. When the upright column 5 drives the base 2 to move upwards to the first position, the axial second ends of the support legs 3 are opened outwards. Inner wall surfaces of the mounting through holes 23 are abutted against outer wall surfaces of the corresponding support legs 3 to keep the support legs 3 in an open position. When the upright column 5 drives the base 2 to move downwards to the second position, the base 2 is located on the axial second ends of the plurality of support legs 3, and the plurality of support legs 3 are in a storage position.

Figure 2:
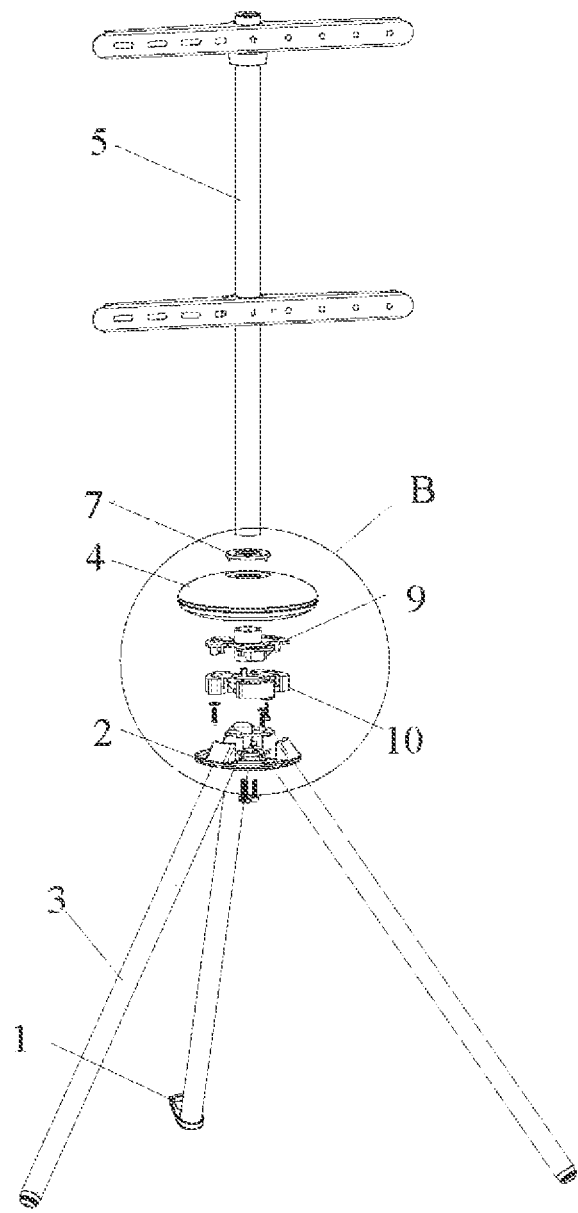
FIG. 2 shows a partially exploded schematic structural diagram of the support device of FIG. 1 (wherein, the support legs are in an open position).

Through the above arrangement, when the upright column 5 is in the first position (as shown in FIG. 2), the base 2 connected with the support legs 3 does no longer limit the axial second ends of the support legs 3, so that the axial second ends of the support legs 3 can be freely opened or closed. Under an elastic action of the elastic structure 11, the axial first ends of the support legs 3 can be moved inward around pivot points. Based on a seesaw principle, the axial second ends of the support legs 3 are opened outwards, and in this case, the support legs 3 are in the open position. Since the inner wall surfaces of the mounting through holes 23 are abutted against the outer wall surfaces of the support legs 3 respectively, the support legs 3 can be kept in the open position, so that the support device can support a to-be-supported member (for example, a liquid crystal television or artworks such as oil painting). When the upright column 5 is moved downwards to the second position (as shown in FIG. 1), the mounting through holes 23 of the base 2 can limit the axial second ends of the support legs 3, and in this case, the support legs 3 are in the storage position, so that the support device is small in size and convenient to carry, store and transport. In addition, because the fixed mounting and closing of the support device is realized only by moving the upright column 5 from the first position to the second position, without complex mounting steps and extra mounting tools, the support device is conveniently operated.

It is to be noted that, that the upright column 5 is located above the support legs 3 means that at least part of the upright column 5 is located above the support legs 3.

Figure 3:
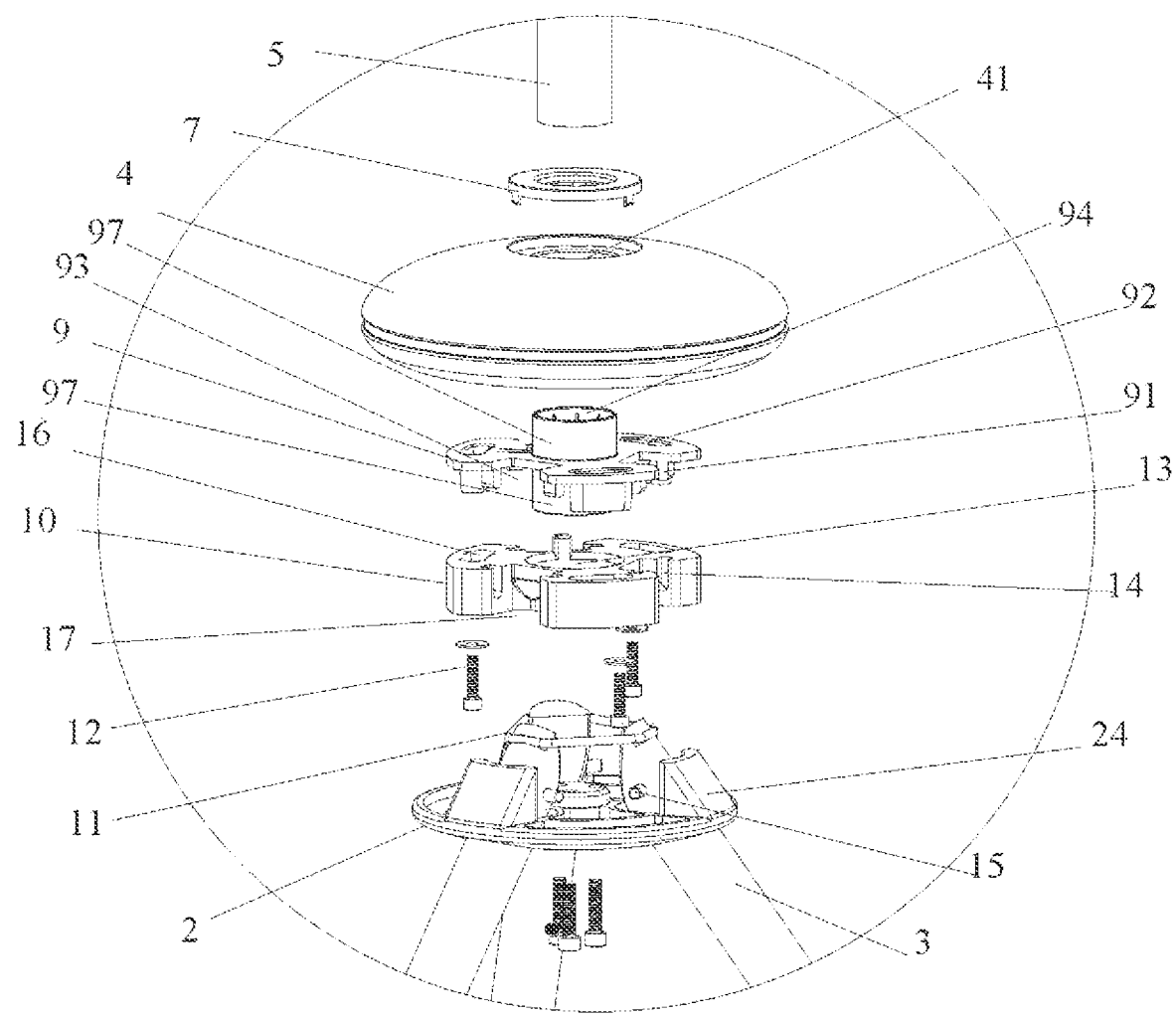
FIG. 3 shows an enlarged view of a part B of the support device of FIG. 2.
Figure 6:
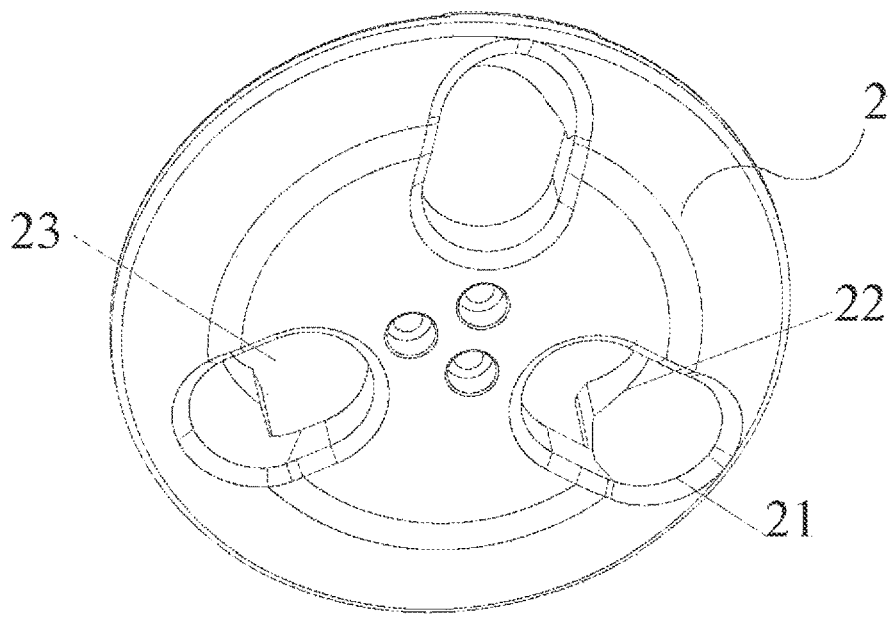
FIG. 6 shows a schematic structural diagram of a base of the support device of FIG. 2.
Figure 7:
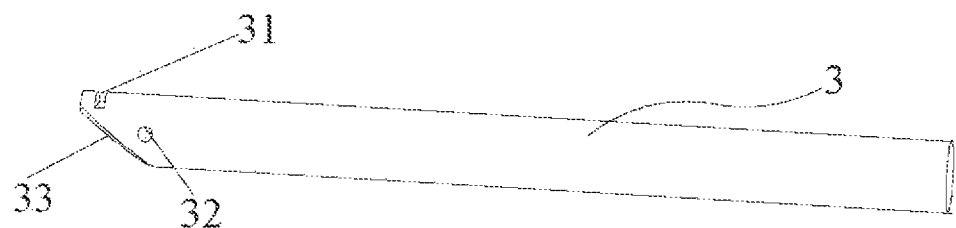
FIG. 7 shows a schematic structural diagram of a support leg of the support device of FIG. 2.

As shown in FIG. 3, FIG. 6 and FIG. 7, in some embodiments of the disclosure, an outer wall surface of an axial first end of each of the plurality of support legs 3 has a first inclined surface 33. When the each of the plurality of support legs 3 is in the open position, an inner wall surface of the positioning member 10 that forms a first mounting notch 17 abuts against the first inclined surface 33 of the each of the plurality of support leg 3 penetrating the first mounting notch 17. Under the interaction of surface-to-surface coordination, the each of the support legs 3 is kept in the open position. In this way, during the using of the support device, the support legs 3 can be avoided from continuing to open outwards, so that the use stability of the support device is guaranteed. The plurality of support legs 3 are pivotally connected with the positioning member 10. According to the seesaw principle, when the axial first ends of the support legs 3 are moved inwards or outwards, the pivot point between the positioning member 10 and each of the support legs 3 is equivalent to a fulcrum. Therefore, the axial second ends of the support legs 3 can be correspondingly opened or closed.

As shown in FIG. 3, in some embodiments of the disclosure, the positioning member 10 is provided with a plurality of first mounting notches 17. The plurality of first mounting notches 17 are disposed corresponding to the plurality of support legs 3. The plurality of first mounting notches 17 are spaced apart from each other in a circumferential direction of the first avoidance through hole 13, and configured for the support legs 3 to pass through. Two sides of each of the first mounting notches 17 are provided with mounting grooves 14. The axial first end of the each of the support legs 3 are provided with a mounting hole 32. A pivot shaft 15 penetrates in the mounting grooves 14 and the mounting hole 32. Therefore, a pivot connection between the each of the support legs 3 and the positioning member 10 is realized.

In some embodiments, the pivot shaft 15 may be a pin or a rotary shaft.

As shown in FIG. 3 and FIG. 7, in some embodiments of the disclosure, an outer wall surface of an axial first end of the each of the support legs 3 is also provided with a groove 31. The elastic structure 11 may be clamped in the groove 31. In this way, linkage of the axial first ends of the plurality of support legs 3 can be realized, so that the plurality of support legs 3 are guaranteed to be synchronously opened or closed.

In some embodiments, the elastic structure 11 is a spring.

Figure 4:
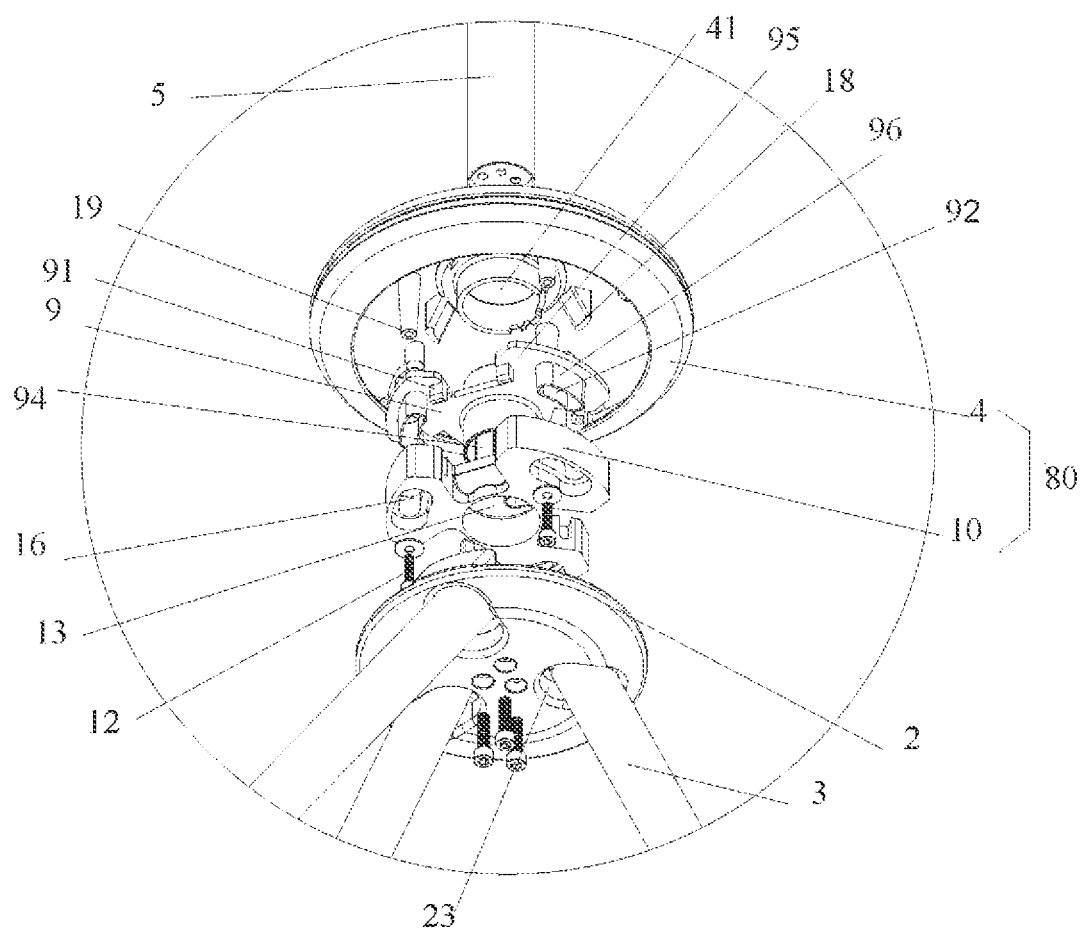
FIG. 4 shows a bottom view of the part B of the support device of FIG. 2.
Figure 5:
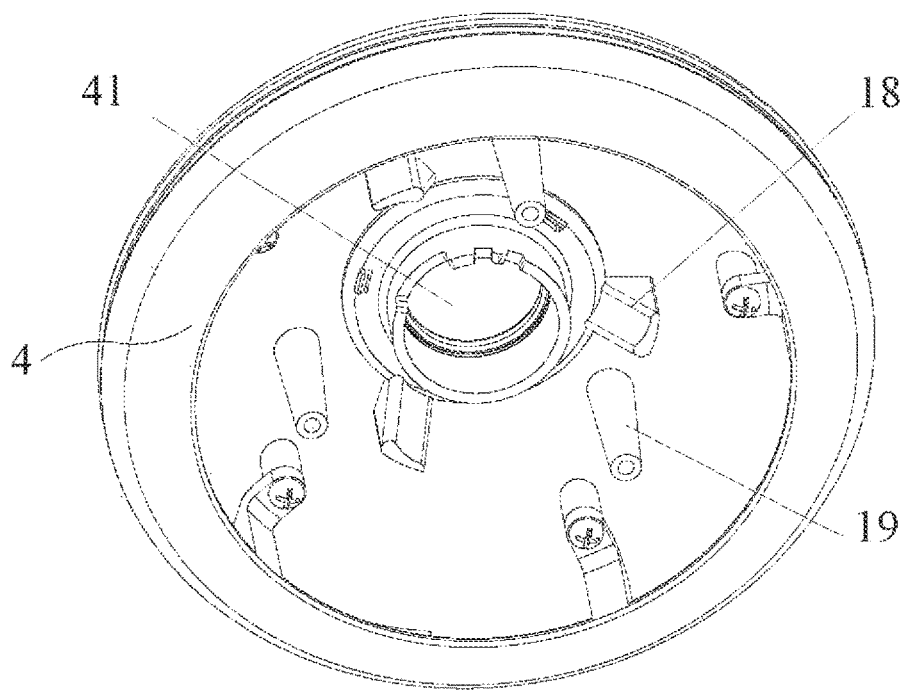
FIG. 5 shows a schematic structural diagram of an operating member of the support device of FIG. 2.

As shown in FIG. 4 and FIG. 5, in some embodiments of the disclosure, the support device further includes an operating member 4 and a plurality of locking members 18. The operating member 4 is connected with the positioning member 10 and defines a second avoidance through hole 41 corresponding to the first avoidance through hole 13. The positioning member 10 is located between the operating member 4 and the base 2. The plurality of locking members 18 are connected with the operating member 4. The plurality of locking members 18 are spaced apart from each other in a circumferential direction of the second avoidance through hole 41. The plurality of locking members 18 are disposed corresponding to the plurality of support legs 3. Each of the locking members 18 has a locking position that abutted against the axial first end of the corresponding support leg 3 and an unlocking position separated from the axial first end of the corresponding support leg 3. The operating member 4 is configured to drive the each of the locking members 18 to switch between the locking position and the unlocking position.

Through the above arrangement, when the each of the support legs 3 is in the open position, the each of the locking members 18 is abutted against the outer wall surface of the axial first end of the corresponding support leg 3 by driving the operating member 4. In this case, the locking member 18 is in the locking positions, so that the axial first end of the support leg 3 can be prevented from continuing to open outward. Therefore, during the using of the support device, the support legs 3 can be avoided from automatically closing, so that the use stability of the support device is guaranteed. By driving the operating member 4, the locking members 18 can be guaranteed to separate from the outer wall surfaces of the axial first ends of the support legs 3. In this case, the locking members 18 are in the unlocking positions, and the axial first ends of the support legs 3 can be freely opened outward, so that the support legs 3 are conveniently closed later. By means of such arrangement, an one-click fixation and unlocking of the support legs 3 can be achieved by driving the operating member 4, so that simple and efficient operations are realized.

In the above technical solution, the second avoidance through hole 41 is provided in the operating member 4 to avoid the upright column 5, so that the upright column 5 is conveniently switched between the first position and the second position. In addition, the operating member 4 is connected with the positioning member 10, and through such arrangement, the support device is compact, stable and reliable in structure.

In some embodiments of the disclosure, the operating member 4 is rotatable relative to the positioning member 10. Specifically, in an embodiment of the disclosure, by clockwise rotating the operating member 4, the locking members 18 can abut against the outer wall surfaces of the axial first ends of the support legs 3, that is, the locking members 18 are switched to the locking positions. When the support device is required to be stored, the locking members 18 and the support legs 3 can be unlocked by rotating the operating member 4 anticlockwise.

In an embodiment that is not shown in the disclosure, the locking members 18 can also be switched between the locking positions and the unlocking positions by pressing the operating member 4.

As shown in FIG. 1 to FIG. 4, in an embodiment of the disclosure, the support device further includes an upper cover assembly 80. The upper cover assembly 80 includes the positioning member 10, the operating member 4, and the plurality of locking members 18. In some embodiments, in order to process easily, the operating member 4 and the locking members 18 are integrally formed.

Figure 10:
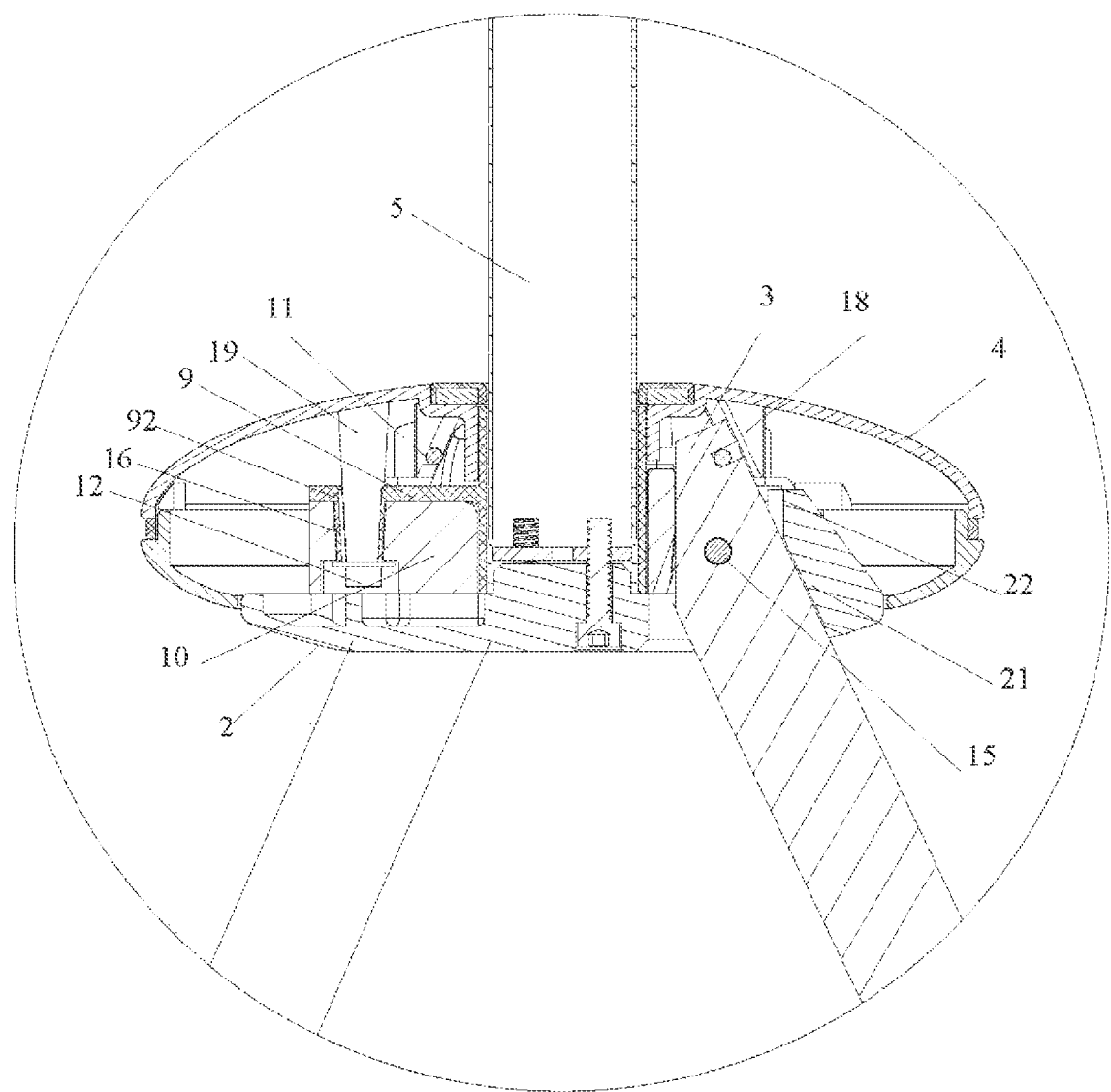
FIG. 10 shows a cross-sectional view of a part C of the support device of FIG. 9.

As shown in FIG. 3, FIG. 4 and FIG. 10, in some embodiments of the disclosure, the positioning member 10 is provided with a first elongated hole 16 extending around a central axis of the first avoidance through hole 13. A first protruding pillar 19 is disposed on the operating member 4. The first protruding pillar 19 is in a slip fit relationship with the first elongated hole 16 to realize rotation of the operating member 4.

In the above technical solution, by the slip fit relationship between the first protruding pillar 19 and the first elongated hole 16, the operating member 4 can rotate relative to the positioning member 10.

As shown in FIG. 3, FIG. 4 and FIG. 10, in some embodiments of the disclosure, the support device further includes a connecting member 9 and a fastening member 12. The connecting member 9 includes a connecting plate 95 and a plurality of long columns 96. The connecting plate 95 defines a third avoidance through hole 94 corresponding to the first avoidance through hole 13. The plurality of long columns 96 are connected with the connecting plate 95. The plurality of long columns 96 are spaced apart from each other in a circumferential direction of the third avoidance through hole 94 and correspond to a plurality of first elongated holes 16. The connecting member 9 further includes a plurality of second elongated holes 92 penetrating the connecting plate 95 and the plurality of long columns 96. The connecting plate 9 is provided with a plurality of second mounting notches 93. The plurality of second mounting notches 93 are corresponding to the plurality of support legs 3. The plurality of second mounting notches 93 are spaced apart from each other in the circumferential direction of the third avoidance through hole 94. The first protruding pillar 19 penetrates the corresponding second elongated hole 92, and is connected with the fastening member 12.

Through the above arrangement, the plurality of long columns 96 correspondingly penetrate in the plurality of first elongated holes 16. The first protruding pillar 19 passes through the corresponding second elongated hole 92 and is connected with the fastening member 12. By means of such arrangement, the upper cover assembly 80 is connected with the connecting member 9, so that the support device is compact in entire structure, and stable and reliable in connection. In some embodiments, the operating member 4 may further rotate relative to the positioning member 10. Therefore, a purpose of locking or unlocking the support legs 3 by using the locking members 18 is realized.

In some embodiments, two positioning columns 97 are further disposed on the connecting plate 95. The two positioning columns 97 are disposed correspondingly and respectively located on upper and lower surfaces of the connecting plate 95. The third avoidance through hole 94 penetrates the connecting plate 95 and the two positioning columns 97. The positioning column 97 that is located on a side, close to the positioning member 10, of the connecting plate 95 penetrates in the first avoidance through hole 13. The positioning column 97 that is located on a side of the connecting plate 95 close to the operating member 4, is matched with the second avoidance through hole 41 in the operating member 4. In this way, the assembling and accurate positioning among the operating member 4, connecting member 9 and the positioning member 10 are realized. In the above technical solution, by providing the second mounting notches 93, the axial first ends of the support legs 3 can penetrate the positioning member 10 and the connecting member 9, and abut against the locking members 18 on the operating member 4. Therefore, the purpose of locking the support legs 3 by using the locking members 18 is achieved. In addition, the third avoidance through hole 94 is also provided in the connecting member 9 to guarantee that the upright column 5 is able to move up and down.

In an embodiment of the disclosure, there are a plurality of first elongated holes 16 and a plurality of second elongated holes 92. The operating member 4 is connected with the positioning member 10 by using the plurality of fastening members 12, so that the connection of the upper cover assembly 80 is more stable and reliable by such arrangement. In addition, in a circumferential direction of the connecting member 9, the second elongated holes 92 and the second mounting notches 93 are alternatively arranged in sequence. As shown in FIG. 5, in some embodiments of the disclosure, a sidewall of the operating member 4 forming the second avoidance through hole 41 is provided with a first sliding groove and a second sliding groove. Elastic clamping columns corresponding to the first sliding groove and the second sliding groove are disposed on the connecting member 9.

In the above technical solution, when the operating member 4 is rotated until the locking members 18 are in the locking positions, the elastic clamping columns can be matched with the sliding grooves under an elastic action.

During a cooperation, since it can make a sound when inner wall surfaces of the clamping columns collide with inner wall surfaces of the sliding grooves, an operator is prompted that it has been rotated to the locking positions, thereby realizing a prompt function.

As shown in FIG. 3, in an embodiment of the disclosure, the positioning member 10 is further provided with a plurality of mounting grooves 14 corresponding to the plurality of first mounting notches 17. In the circumferential direction, two sides of each of the plurality of first mounting notches 17 are provided with the mounting grooves 14. The pivot shafts 15 are disposed on the axial first ends of the support legs 3. Two ends of each of the pivot shafts 15 are mounted in the corresponding two mounting grooves 14. The support device further includes a plurality of anti-separating members 91 connected with the connecting member 9. The plurality of anti-separating members 91 are disposed corresponding to the plurality of mounting grooves 14. The anti-separating members 91 are abutted against the corresponding pivot shafts 15 respectively, to prevent the support legs 3 from separating from the positioning member 10.

In the above technical solution, each of the pivot shafts 15 penetrates the mounting hole 32 of the corresponding support leg 3, and the two ends of the each of the pivot shafts 15 are mounted in the corresponding mounting grooves 14. Each of the anti-separating members 91 is a cylinder capable of being mated with the mounting groove 14. The each of the anti-separating members 91 can be inserted in the corresponding mounting grooves 14, and abut against the corresponding pivot shaft 15 mounted in the corresponding mounting grooves 14. Therefore, the corresponding support leg 3 is avoided from being separated from the positioning member 10. In addition, during the opening and closing of each of the support legs 3, by the limitation of the anti-separating member 91, the two axial ends of the each of the support legs 3 can be moved around a fixed pivot point, so that the use stability of the support device can be guaranteed.

As shown in FIG. 3, FIG. 6 and FIG. 10, in an embodiment of the disclosure, the support device further includes a blocker 24 connected with the base 2. The blocker 24 is disposed on a radial outer side of at least one mounting through hole 23. The blocker 24 has a second inclined surface 21. When the support legs 3 are in the open position, the second inclined surface 21 is abutted against an outer wall surface of the corresponding support leg 3.

In the above technical solution, when the each of the support legs 3 is in the open position, the second inclined surface 21 of the blocker 24 is abutted against the outer wall surface of the corresponding support leg 3, so cause the corresponding support leg 3 to be kept in the open position. In this way, during the using of the support device, the axial first end of the corresponding support leg 3 is prevented from continuing to open outwards, so as to further guarantee the use stability of the support device.

In some embodiments, the second inclined surface 21 is an arc-shaped surface capable of being matched with the outer wall surface of the support leg 3.

Figure 12:
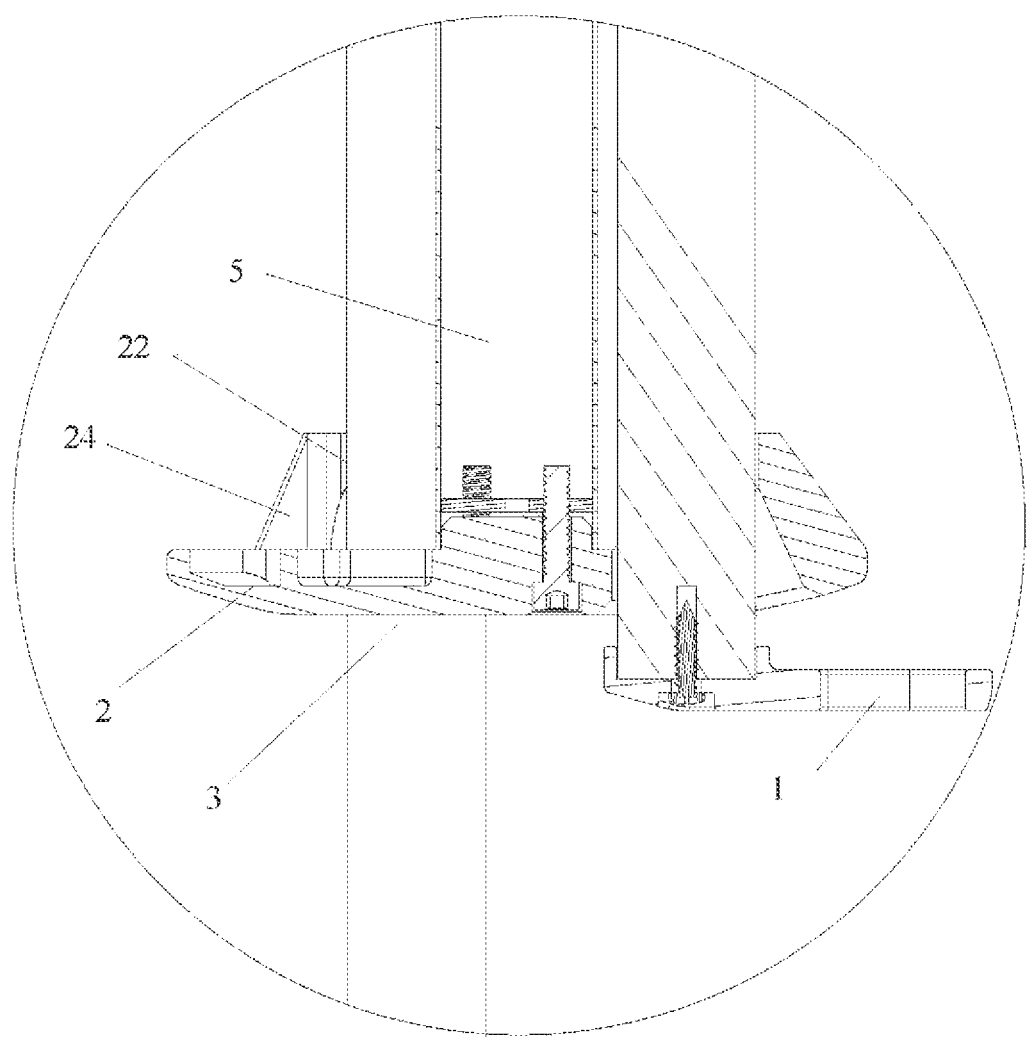
FIG. 12 shows a cross-sectional view of a part D of the support device of FIG. 1.

As shown in FIG. 3, FIG. 6 and FIG. 12, in an embodiment of the disclosure, the blocker 24 further has a vertical surface 22 connected with the second inclined surface 21. When the each of the support legs 3 is in the storage position, the vertical surface 22 is abutted against the outer wall surface of the support leg 3.

Through the above arrangement, when the each of the support leg 3 is in the storage position, the base 2 is located on the axial second end of the corresponding support leg 3. The vertical surface 22 disposed on the blocker 24 can prevent the corresponding support leg 3 from opening under the action of the elastic structure 11, so that the entire support device is kept in the storage position.

Figure 11:
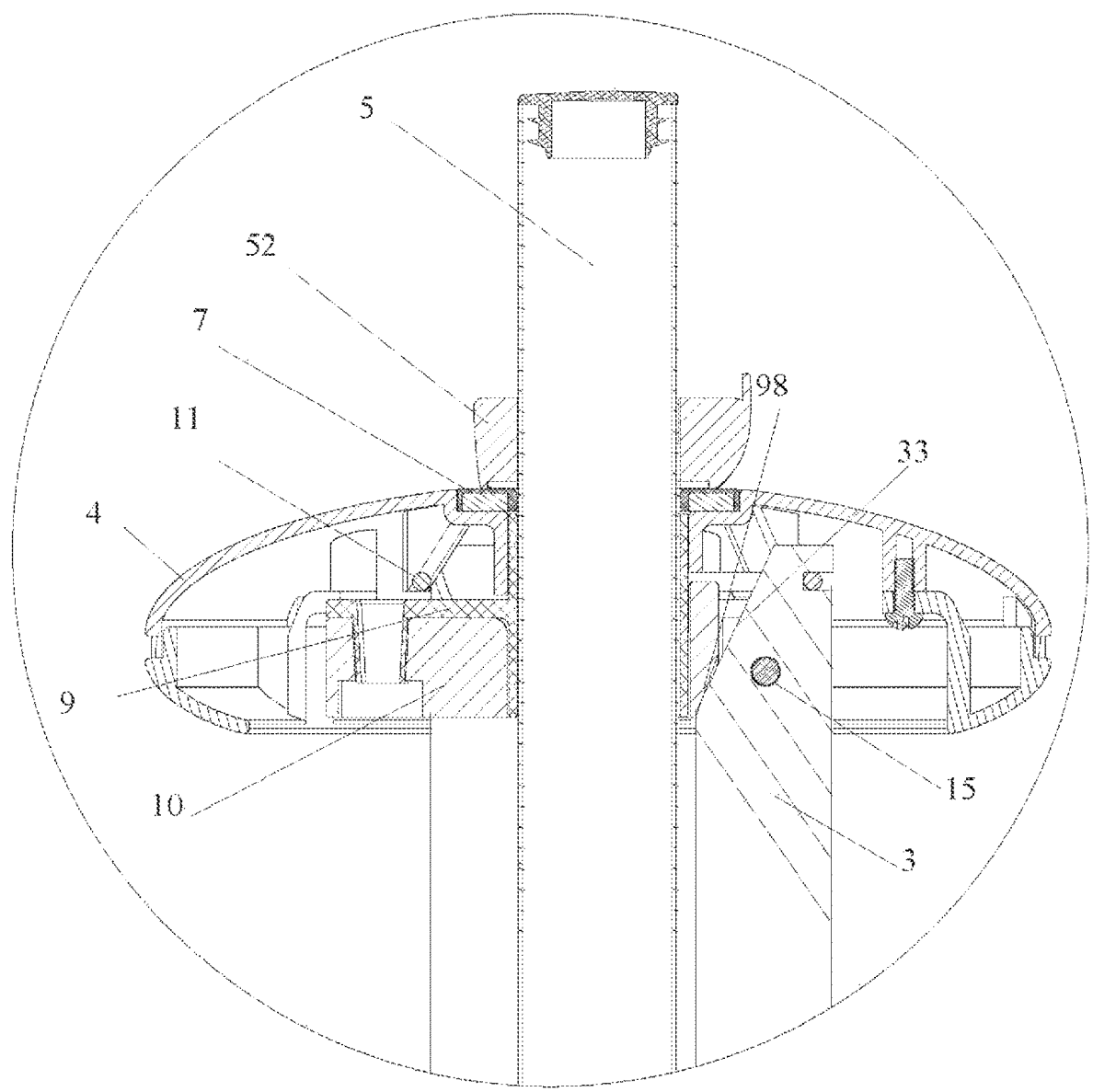
FIG. 11 shows a cross-sectional view of a part E of the support device of FIG. 1.

In some embodiments, the inner wall surface of the positioning member 10 forming the first mounting notch 17 may be a plane or inclined surface. As shown in FIG. 11, a corresponding position of the positioning member 10 forming the first mounting notch 17 has a third inclined surface 98, and the third inclined surface is configured to avoid the corresponding support leg 3. When the each of the support legs 3 is in a closed position, part of the axial first end of the each of the support legs 3 is located in an avoidance space formed by the third inclined surface 98. Therefore, the axial first end of the each of the support legs 3 can be prevented from being blocked by the inner wall surface of the positioning member 10, resulting in failed closing of the each of the support legs 3.

Figure 13:
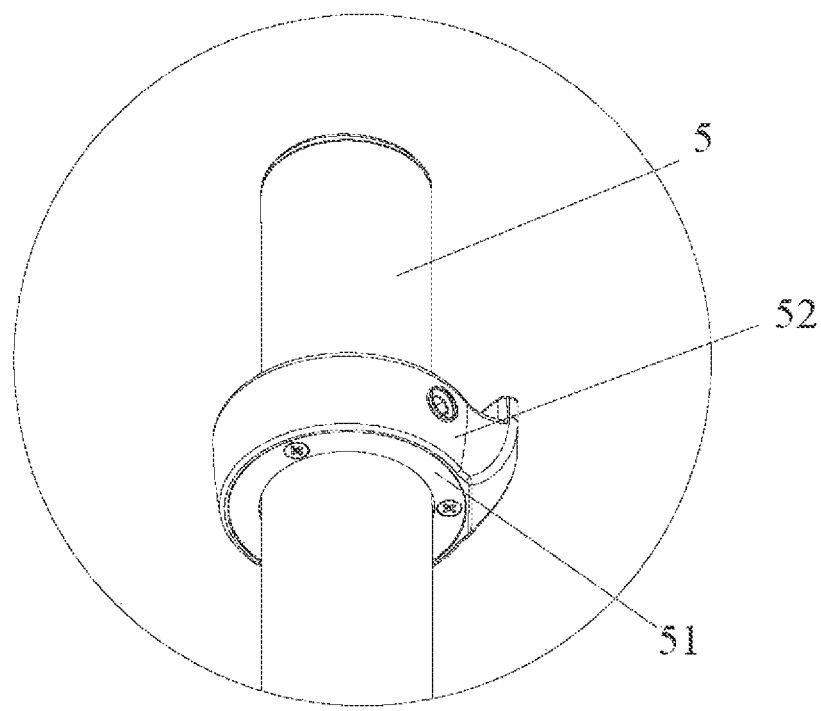
FIG. 13 shows an enlarged view of a part A of the support device of FIG. 8.

As shown in FIG. 1, FIG. 11 and FIG. 13, in an embodiment of the disclosure, the support device further includes a fixation structure configured to keep the upright column 5 in the second position. The fixation structure includes a first fixation member 7 disposed on a side of the operating member 4 and a second fixation member 51 disposed on the upright column 5. When the upright column 5 is in the second position, the first fixation member 7 is connected with the second fixation member 51. When the upright column 5 is in the first position, the first fixation member 7 is separated from the second fixation member 51.

Through the above arrangement, when the support device is in the closed position, under a connection between the first fixation member 7 and the second fixation member 51, the upright column 5 can be kept in the second position. In this way, during carrying or storage, a problem that automatic moving of the upright column 5 caused by an inversion of the support device is prevented. Therefore, the support device is easier to store and carry, thereby further enhancing the use convenience of the device.

Figure 8:
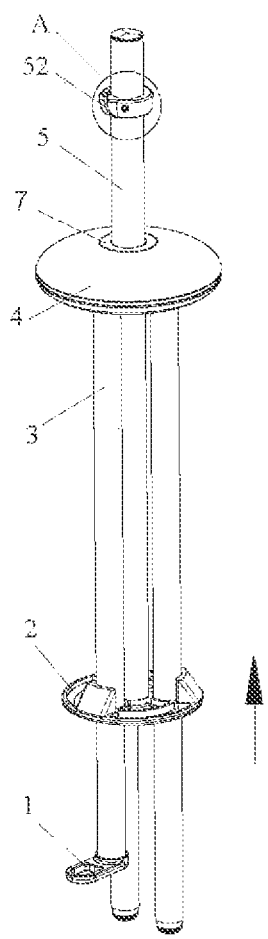
FIG. 8 shows a schematic structural diagram of the support device of FIG. 1 (wherein, an upright column is located between a first position and a second position).

As shown in FIG. 8 and FIG. 13, in an embodiment of the disclosure, the first fixation member 7 is connected with the second fixation member 51 by a magnetic attractable manner.

In an embodiment of the disclosure, the first fixation member 7 is a magnet. The second fixation member 51 is an iron sheet. When the support device is in the closed position, the first fixation member 7 is connected with the second fixation member 51 by the magnetic attractable manner. In this case, the upright column 5 cannot be automatically moved without applying an external force. When the support device is required to be mounted, the support device can be mounted with one click only by applying an acting force toward the first position and greater than a magnetic attraction force to the upright column 5.

Figure 14:
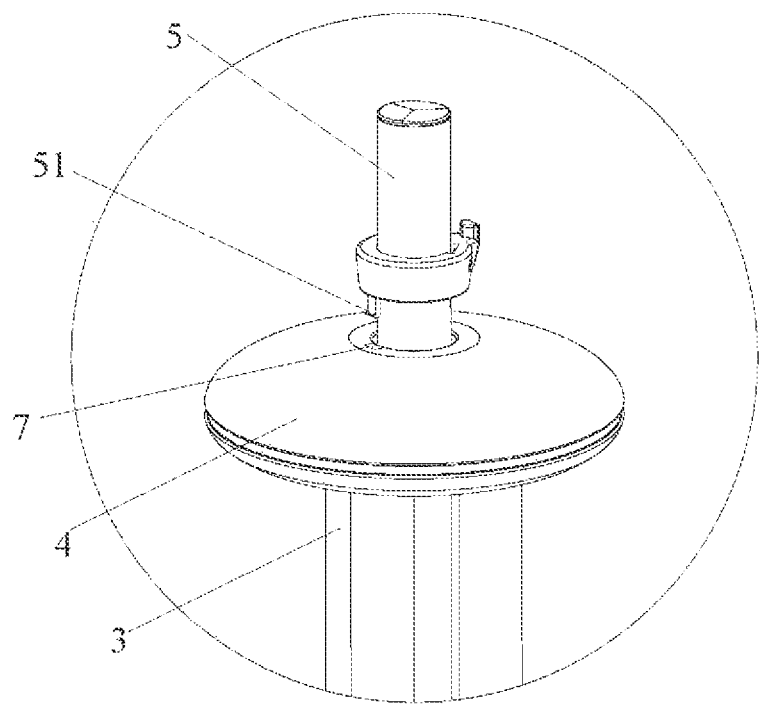
FIG. 14 shows a schematic structural diagram of a fixation structure of another embodiment of a support device according to the disclosure.
Figure 15:
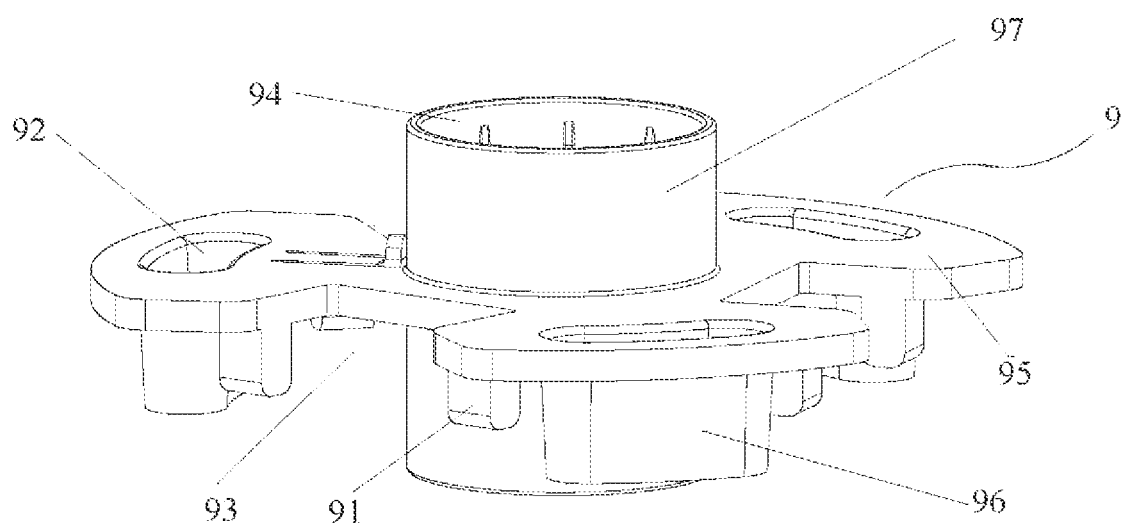
FIG. 15 shows a schematic structural diagram of a connecting member of the support device of FIG. 2.

As shown in FIG. 14, in some embodiments of the disclosure, the first fixation member 7 and the second fixation member 51 can also be in clamping connection.

In some embodiments, the first fixation member 7 is a clamping hole. Correspondingly, the second fixation member 51 is a buckle. Therefore, the first fixation member 7 is connected with the second fixation member 51 in a clamping manner.

In some embodiments of the disclosure, the second fixation member 51 is movable in a vertical direction relative to the upright column 5.

In the above technical solution, a clamp 52 is further disposed on the upright column 5. The second fixation member 51 is connected to the clamp 52. When the clamp 52 is closed, the second fixation member 51 is fixedly connected with the upright column 5. When the clamp 52 is opened, the second fixation member 51 can be freely moved in the vertical direction. Through the above arrangement, according to actual requirements of a user, the clamp 52 is able to position the second fixation member 51 in different positions on the upright column 5. Therefore, the support device can have different lengths at a closed state, so as to adapt various application environments.

As shown in FIG. 2, in an embodiment of the disclosure, the support device further includes a pedal structure 1. The pedal structure 1 is disposed on the axial second end of at least one support leg 3.

Through the above arrangement, during the mounting and closing of the support device, the support device can be prevented from shaking by fixing the pedal structure 1, so that stability during mounting and closing is guaranteed. Therefore, the support device is more convenient in operation.

A mounting process of the support device according to the embodiments of the disclosure is described below.

Figure 9:
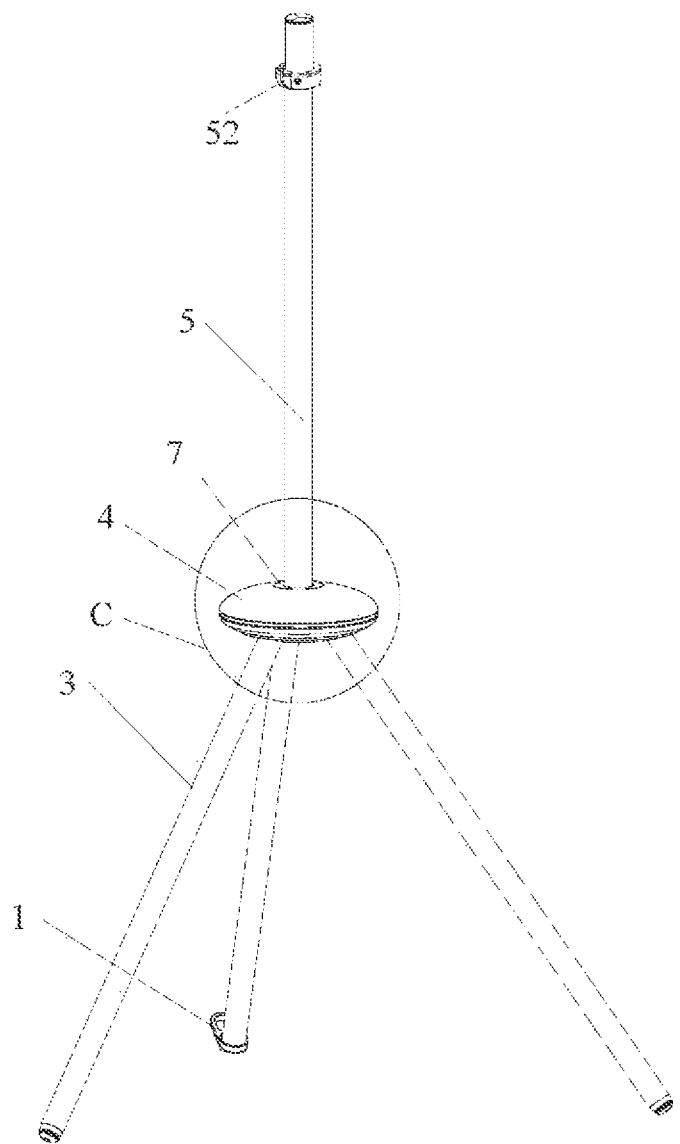
FIG. 9 shows a schematic structural diagram of the support device of FIG. 1 (wherein, the support legs are in the open position).

As shown in FIG. 1, firstly, the pedal structure 1 is fixed to prevent the support device from shaking to affect mounting. An upward acting force is applied to the upright column 5. When the acting force is greater than a magnetic attraction force between the first fixation member 7 and the second fixation member 51, the first fixation member 7 is separated from the second fixation member 51. As shown in FIG. 8, the upright column 5 can be moved from the second position to the first position. When the upright column 5 reaches the first position, as shown in FIG. 9, the base 2 fixedly connected with the upright column 5 simultaneously reaches the axial first ends of the support legs 3. In this case, the base 2 does no longer limit the axial second ends of the support legs 3, so that the axial second ends of the support legs 3 can be opened outwards (that is, the axial second end of the each support leg 3 can be swung around the pivot point). Since the elastic structure 11 always has an acting force on the axial first ends of the support legs 3 to move radially inward, the axial second ends of the support legs 3 are opened outwards under an action of the elastic structure 11. In addition, the support legs 3 are kept in the open position under the limitation of the mounting through holes 23. By clockwise rotating the operating member 4, the locking members 18 are abutted against the outer wall surfaces of the axial first ends of the support legs 3. Therefore, the support legs 3 can be guaranteed to not automatically close due to accidental touch or movement during the using of the support device. Therefore, the mounting of the support device is completed. The support device is in a more stable and firm state, which can be configured to support a to-be-supported member.

A storage process of the support device according to the embodiments of the disclosure is described below.

As shown in FIG. 9, firstly, by rotating the operating member 4 anticlockwise, the locking members 18 are separated from the outer wall surfaces of the axial first ends of the support legs 3, so that the axial first end of the each support leg 3 can be freely opened outwards. In this case, the plurality of opened support legs 3 are closed together manually, and a downward acting force is applied to the upright column 5, so that the upright column 5 can be moved from the second position to the first position. The plurality of support legs 3 can be kept in the closed state under the limitation of the vertical surfaces 22 of the mounting through holes 23. When the upright column 5 is moved to the first position, as shown in FIG. 1, the first fixation member 7 and the second fixation member 51 come into contact with and attract each other. In this way, without applying an external force, the upright column 5 can no longer be moved up and down relative to the support legs 3, so that the support device can be kept in a storage state. In addition, the support device is small in size, and convenient to carry, store and transport.

Therefore, by the above operation steps, the fixed mounting and closing of the support device can be realized only by moving the upright column 5 to the first position and the second position. The purpose of locking or unlocking the support legs 3 by using the locking members 18 can be achieved only by rotating the operating member 4 without complex mounting steps and extra mounting tools. Therefore, the support device in the embodiments is efficient and convenient in operation.

It may be learned from the above description that, in the above embodiments of the disclosure, the following technical effects are realized.

When the upright column is in the first position and under the action of the elastic structure, the axial first ends of the support legs can be moved inwards and drive the axial second ends of the support legs to open outwards, so that the support legs are in the open position, and the support device is able to support the to-be-supported member. When the upright column is moved downward to the second position, the mounting through holes of the base can limit the axial second ends of the support legs, and the support legs are in the storage position, so that the support device is small in size, which is convenient to carry, store and transport. In addition, because the fixed mounting and closing of the support device can be realized only by moving the upright column to the first position or the second position without complex mounting steps and extra mounting tools, the support device is efficient and convenient in operation. When the support legs are in the open position, the locking members are abutted against the outer wall surfaces of the axial first ends of the support legs by driving the operating member. In this way, during the using of the support device, a problem that the automatic closing of the support legs due to accidental touch is prevented, so that the use stability of the support device is guaranteed. By driving the operating member, the locking members are separate from the outer wall surfaces of the axial first ends of the support legs, that is, the locking members are in the unlocking positions. In this way, the axial first ends of the support legs can be freely opened outward, that is, the support legs can be closed. By such arrangement, the one-click fixation and unlocking of the support legs can be achieved by driving the operating member, so that simple and efficient operations are realized. In addition, the blocker having the second inclined surface and the vertical surface is disposed on the base. The vertical surface can keep the support leg in the storage position. Under the combined action with the locking members, the second inclined surface can keep the support device in the open position. Therefore, the support device is more stable and reliable in usage. By the connection between the first fixation member and the second fixation member, the support device can be kept in the storage position, which is more convenient to use.

The above are only some embodiments of the disclosure and are not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

What is claimed is:

1. A support device, comprising:
an upright column;
a base, fixedly connected with the upright column;
a plurality of support legs, spaced apart from each other in a circumferential direction of the upright column, wherein an axial first end of each support leg is penetrated through the base;
a positioning member, provided with a first avoidance through hole for the upright column to pass through, the base being located on a side of the positioning member; and the upright column is movable together with the base relative to the positioning member, so that an axial second end of the each support leg is opened outwardly or retracted inwardly
wherein the base is provided with a plurality of mounting through holes corresponding to the plurality of support legs, each of the support legs passes through a corresponding mounting through hole in the plurality of mounting through holes, then the each of the support legs is pivotally connected with the positioning member, the upright column is movably disposed up and down relative to the positioning member, the upright column has at least a first position located above the support legs and a second position located between the plurality of support legs; and
an elastic structure, disposed at peripheries of the plurality of support legs and configured to apply an acting force to axial first ends of the support legs to cause the axial first ends to move inward radially, wherein when the upright column drives the base to move upwards to the first position, the axial second ends of the support legs are opened outwards, inner wall surfaces of the mounting through holes abut against outer wall surfaces of the corresponding support legs respectively, so as to keep the support legs in an open position, when the upright column drives the base to move downwards to the second position, the base is located on the axial second ends of the support legs, and the support legs are in a storage position;
an operating member, connected with the positioning member, wherein the operating member defines a second avoidance through hole corresponding to the first avoidance through hole, and the positioning member is located between the operating member and the base;
wherein the support device further comprises:
a plurality of locking members, connected with the operating member, wherein the plurality of locking members are spaced apart from each other in a circumferential direction of the second avoidance through hole, the plurality of locking members are disposed corresponding to the plurality of support legs, each of the plurality of locking members has a locking position that abut against the axial first end of a corresponding support leg of the plurality of support legs and an unlocking position separated from the axial first end of the corresponding support leg, and the operating member is configured to drive each of the plurality of locking members to switch between the locking position and the unlocking position.

2. The support device as claimed in claim 1, wherein the operating member is rotatable relative to the positioning member.

3. The support device as claimed in claim 2, wherein the positioning member is provided with at least one first elongated hole extending around a central axis of the first avoidance through hole, at least one first protruding pillar is disposed on the operating member, the at least one first protruding pillar is in a slip fit relationship with the at least one first elongated hole to realize rotation of the operating member, the support device further comprises at least one fastening member, and each of the at least one first protruding pillar is connected with a corresponding fastening member of the at least one fastening member to fix the operating member on the positioning member.

4. The support device as claimed in claim 3, wherein the positioning member is provided with a plurality of first mounting notches corresponding to the plurality of support legs, the support device further comprises a connecting member, and the connecting member comprises:
a connecting plate, defining a third avoidance through hole corresponding to the first avoidance through hole; and
a plurality of long columns, connected with the connecting plate, wherein the plurality of long columns are spaced apart from each other in a circumferential direction of the third avoidance through hole and correspond to a plurality of the at least one first elongated hole, the connecting member further comprises a plurality of second elongated holes penetrating the connecting plate and the plurality of long columns, the connecting plate is provided with a plurality of second mounting notches, the plurality of second mounting notches are disposed corresponding to the plurality of support legs, the plurality of second mounting notches are spaced apart from each other in the circumferential direction of the third avoidance through hole, an axial first end of the each support leg in sequence passes through a corresponding first mounting notch and a corresponding second mounting notch, and the each of the at least one first protruding pillar is connected with the corresponding fastening member of the at least one fastening member after passing through a corresponding second elongated hole of the plurality of second elongated holes.

5. The support device as claimed in claim 4, wherein the positioning member is further provided with a plurality of mounting grooves corresponding to the plurality of first mounting notches, each mounting groove communicates with a corresponding first mounting notch in the plurality of first mounting notches, pivot shafts are disposed on the axial first end of the support legs, each of the pivot shafts is mounted in a corresponding mounting groove of the plurality of mounting grooves, the support device further comprises a plurality of anti-separating members connected with the connecting plate, the plurality of anti-separating members are disposed corresponding to the plurality of mounting grooves, and each of the anti-separating members is abutted against a corresponding pivot shaft of the pivot shafts, to prevent the corresponding support leg from separating from the positioning member.

6. The support device as claimed in claim 4, wherein the axial first end of the each of the support legs has a first inclined surface, and when the each of the support legs is in the open position, the first inclined surface is abutted against an inner wall surface of the corresponding first mounting notch.

7. The support device as claimed in claim 1, wherein the support device further comprises blockers connected with the base, the blockers are arranged corresponding to the plurality of mounting holes, each of the blockers projects outwardly from one side of a corresponding mounting hole of the mounting holes and is not a part of the corresponding mounting hole itself, the each of the blockers has a second inclined surface, and when the each of the support legs is in the open position, the second inclined surface is abutted against an outer wall surface of a corresponding support leg of the plurality of support legs.

8. The support device as claimed in claim 7, wherein the each of the blockers also has a vertical surface connected with the second inclined surface, and when the each of the support legs is in the storage position, the vertical surface is abutted against the outer wall surface of the corresponding support leg.

9. The support device as claimed in claim 1, wherein the each of the plurality of support legs is provided with a groove, the elastic structure comprises an elastic member, and the elastic member is clamped in grooves corresponding to the support legs.

10. The support device as claimed in claim 1, wherein the support device further comprises a fixation structure configured to keep the upright column in the second position, the fixation structure comprises a first fixation member disposed on a side of the operating member and a second fixation member disposed on the upright column, when the upright column is in the second position, the first fixation member is connected with the second fixation member, and when the upright column is in the first position, the first fixation member is separated from the second fixation member.

11. The support device as claimed in claim 10, wherein the first fixation member is connected with the second fixation member by a magnetic attractable manner; or, the first fixation member is in clamping connection with the second fixation member.

12. The support device as claimed in claim 10, wherein the second fixation member is movable in a vertical direction relative to the upright column.

13. The support device as claimed claim 1, wherein the support device further comprises a pedal, and the pedal is disposed on the axial second end of at least one support leg in the plurality of support legs.

14. The support device as claimed in claim 2, wherein the support device further comprises blockers connected with the base, the blockers are arranged corresponding to the plurality of mounting holes, each of the blockers projects outwardly from one side of a corresponding mounting hole of the mounting holes and is not a part of the corresponding mounting hole itself, the each of the blockers has a second inclined surface, and when the each of the support legs is in the open position, the second inclined surface is abutted against an outer wall surface of a corresponding support leg of the plurality of support legs.

15. The support device as claimed in claim 3, wherein the support device further comprises blockers connected with the base, the blockers are arranged corresponding to the plurality of mounting holes, each of the blockers projects outwardly from one side of a corresponding mounting hole of the mounting holes and is not a part of the corresponding mounting hole itself, the each of the blockers has a second inclined surface, and when the each of the support legs is in the open position, the second inclined surface is abutted against an outer wall surface of a corresponding support leg of the plurality of support legs.

16. The support device as claimed in claim 4, wherein the support device further comprises blockers connected with the base, the blockers are arranged corresponding to the plurality of mounting holes, each of the blockers projects outwardly from one side of a corresponding mounting hole of the mounting holes and is not a part of the corresponding mounting hole itself, the each of the blockers has a second inclined surface, and when the each of the support legs is in the open position, the second inclined surface is abutted against an outer wall surface of a corresponding support leg of the plurality of support legs.

17. The support device as claimed in claim 5, wherein the support device further comprises blockers connected with the base, the blockers are arranged corresponding to the plurality of mounting holes, each of the blockers projects outwardly from one side of a corresponding mounting hole of the mounting holes and is not a part of the corresponding mounting hole itself, the each of the blockers has a second inclined surface, and when the each of the support legs is in the open position, the second inclined surface is abutted against an outer wall surface of a corresponding support leg of the plurality of support legs.

* * * * *